March 6, 1945. O. S. BOLLING 2,370,932
CUTOFF SAW MECHANISM FOR SHEET FEEDING MACHINES
Filed April 25, 1942 5 Sheets-Sheet 4

Inventor
Oscar S. Bolling
By his Attorneys

March 6, 1945.　　　O. S. BOLLING　　　2,370,932
CUTOFF SAW MECHANISM FOR SHEET FEEDING MACHINES
Filed April 25, 1942　　　5 Sheets-Sheet 5
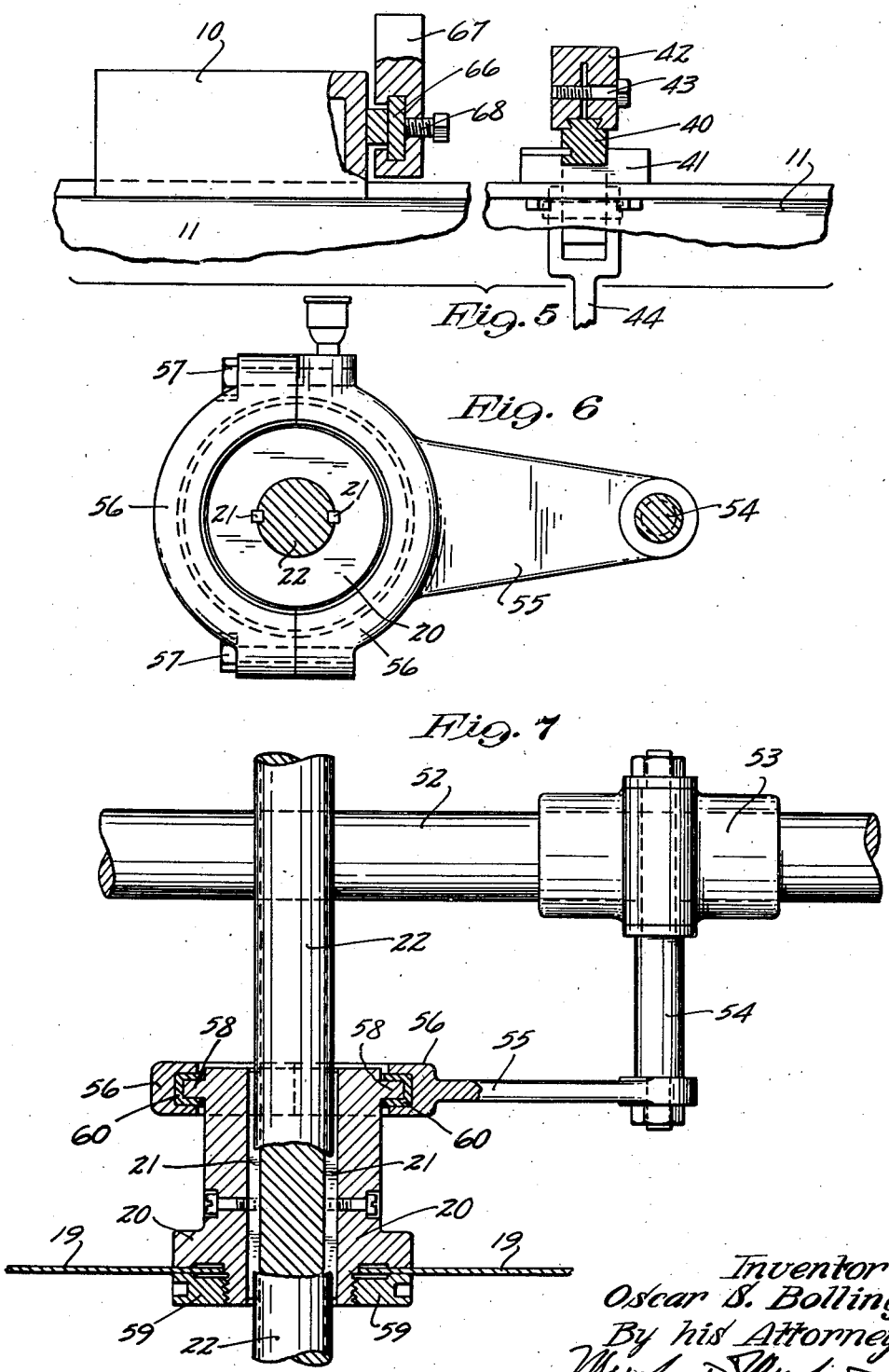

Patented Mar. 6, 1945

2,370,932

UNITED STATES PATENT OFFICE 2,370,932

CUTOFF SAW MECHANISM FOR SHEET FEEDING MACHINES

Oscar S. Bolling, Minneapolis, Minn., assignor to Mereen-Johnson Machine Company, Minneapolis, Minn., a corporation of Minnesota Application April 25, 1942, Serial No. 440,456

12 Claims. (Cl. 143—47)

My present invention relates to machines for making sheets from relatively narrow wooden strips or slats and is especially designed as an improvement on machines such as that disclosed and claimed in my pending application S. N. 407,147, filed August 16, 1941, and entitled "Plywood-core machine." Such machines are especially adapted for making, out of wooden slats or strips, plywood cores that are to be applied between veneer strips or sheets. Many of the features of the present improved machine are in common with those of the above identified pending application. In the present improved machine the structure is such that the transversely movable cut-off saw will travel with the core or composite sheet if, in fact, there is a feeding movement of the core while the cut-off saw is travelling transversely to cut-off a predetermined length of the sheet. Otherwise stated, the cut-off saw will cut on a line at right angles to the edges of the sheet, regardless of whether or not there is a feed movement of the sheet during the transverse cutting action.

The chief novelty of the present invention is in the improved means for accomplishing the results just above stated. This improved structure and result is obtained in a very simple way and by simple means, as will hereinafter more fully appear in connection with the drawings which illustrate a commercial form of the improved machine.

The present machine has further improvements over the prior machine in that, among other things, the trimmed and cut off sheet can not remain on the feed table and stop the operation of the machine but will be automatically released and ejected from the machine.

Referring to the drawings, wherein like characters indicate like parts throughout the several views:

Fig. 5 is a fragmentary view partly in elevation and partly in section taken on the line 5—5 of Fig. 1;

Fig. 6 is a section taken on the line 6—6 of Fig. 1; and

Fig. 7 is a fragmentary section taken on the line 7—7 of Fig. 2, some parts being broken away.

Figure 2:
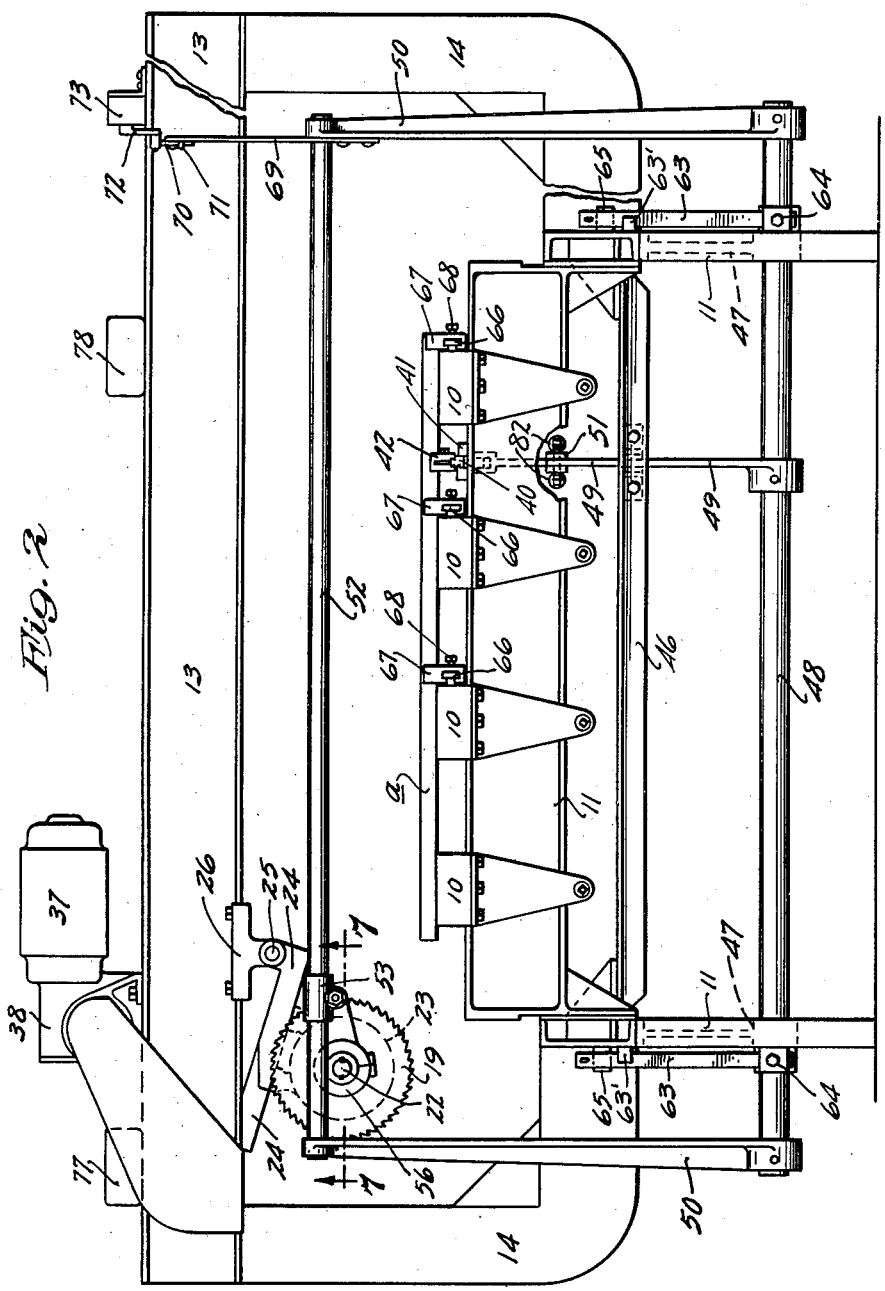
Fig. 2 is an end elevation of the machine looking from the right toward the left in respect to Fig. 1.

The parts of the present machine that are common to those of the prior machine may be briefly described as follows: The core or sheet-forming wooden strips are placed on a feed table, not shown, and under the action of suitable feed mechanism, preferably such as shown in my prior application, the core sheet $a$ will be fed rearward onto the skid rails 10 that are rigidly supported from a main frame 11. The numerals 12 and 13 indicate heavy bridge beams that are located above and span the skid rails 10 and at their ends are rigidly supported from the main frame 11. As best shown in Fig. 2, the ends of beam 13 are attached to the framework 11 by heavy brackets 14.

Edge trimming saws 15 are carried by the rotor shafts of electric motors 16, and are positioned to trim off the edges of the core-forming sheet $a$ as the latter is forced past the same. The casings of motors 16 are shown as carried by carrier frames 17 that are slidably adjustable on the beam 12 so that the edge trimming saws may be properly adjusted to the width of the sheet $a$. The numeral 18 indicates leaf-like hold-down springs attached to the beam 12 and operative to press the sheet $a$ onto the skid rails 10.

The cut-off mechanism involves a circular cut-off saw 19 which, in this preferred arrangement, is carried by a collar 20 which, by a spline and groove connection 21, is slidably mounted on the extended end of the rotor shaft 22 of an electric motor 23. See Fig. 3. The frame of the motor 23 is mounted on a vertically movable support 24 that is pivoted at 25 to a carrier 26 mounted to travel on the lower flange of the bridge beam 13. See Fig. 4. The pivoted lever-acting support 24 for cut-off saw 19 and its motor is formed or provided with an upwardly extended arm 24'. The arm 24', at its upper end, is pivoted on a stud 27 of a bracket or coupling element 28 (see Fig. 1) that is firmly attached to one of the links of an endless sprocket-acting chain 29. This carrier chain is arranged to run in the channel of the bridge beam 13 and to run over guide wheels 30 and 31 that are in the form of sprockets. The sprocket 30 is a driving sprocket for chain 29 and is secured on the shaft 32 that extends through the web of beam 13 and is journaled in bearings 33 on said web. At its other end shaft 32 is provided with a sprocket 34. See Fig. 1. Sprocket 34 is aligned with a sprocket 35 on the extended end of the shaft 36, which latter is driven from a motor 37, the casing of which is rigidly mounted on top of the beam 13. The shaft 36 is driven from the rotor of motor 37, through reducing gears of well known commercial form or of any suitable type, not shown in detail, but contained within a casing 38. A belt or sprocket chain 39 runs over the sprockets 34 and 35.

A cut-off actuating bar 40, see Figs. 1, 2, 3 and 5, is mounted to slide in the direction of the feed of the core sheet and to work between certain of the skid rails. As shown in Fig. 5, this actuating bar or slide 40 is held by and mounted to slide on guide blocks 41 rigidly secured on the cross members of frame 11. At its rear end bar 40 has a raised actuating lug or projection 42 against which the core sheet will be engaged when it has passed the cut-off saw the proper distance. Lug 42, in the preferred arrangement, has a dovetailed engagement with bar 40 and is adjustably but rigidly clamped thereon by a machine screw 43. At a point forward of the rear of the main frame, bar 40 is pivotally connected to the upper end of a lever 44. At its lower end lever 44 is pivotally connected to a link 45, the rear end of which is pivoted to a cross bar or fixed element 46 of the main frame.

Figure 3:
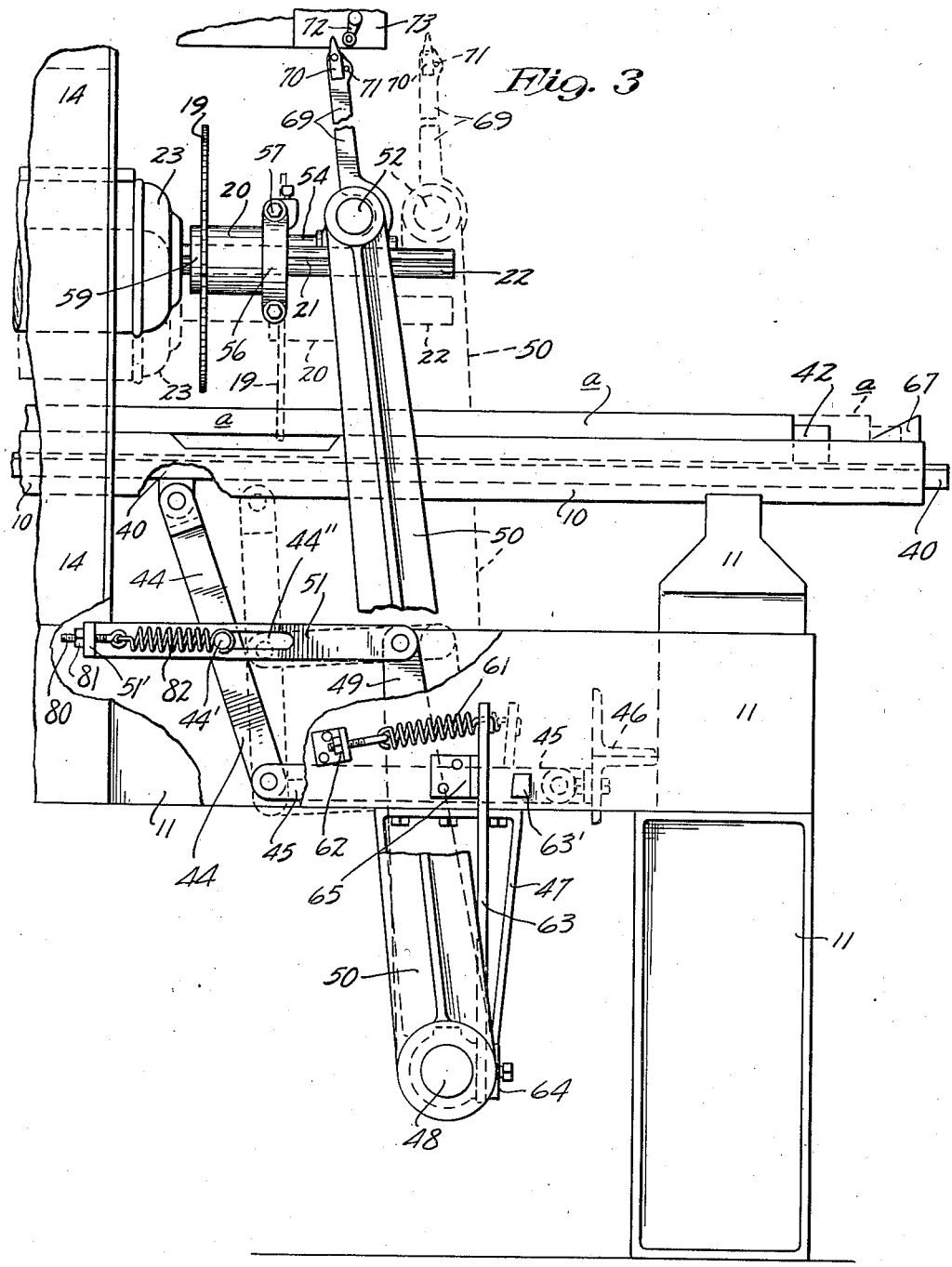
Fig. 3 is a side elevation of the machine looking from the left toward the right in respect to Fig. 2.

Rigidly secured to and depending from the main frame 11 are heavy hanger brackets 47 in the lower ends of which is mounted a long transverse rock-shaft 48, see particularly Figs. 2 and 3. Rigidly secured to and extended upward from the rock-shaft 48 is a relatively short arm 49 and two relatively long arms 50. The upper end of the short arm 49 is connected to the central portion of lever 44 by a link 51. The upper ends of the long arms 50 are tied together by a long smooth guide or shifter rod 52 which extends at a right angle to and slightly above the extended end of motor shaft 22, see Figs. 1, 2, 3 and 7.

For reasons that will hereinafter be made apparent, pivotal connection between the link 51 and the intermediate or central portion of the lever 44 is made by means of a pivot pin 44" on lever 44 and which pin works in a longitudinal slot 44" in link 51; pin 44' being yieldingly retained, during all normal operating conditions, against the front end of slot 44" by a spring 82. The spring 82 is hooked over the projected end of pivot pin 44' and at its other end is anchored to the outturned front end 51' of link 51 by a turn-buckle-acting eye-bolt 80 and tension adjusting nut 81. It will be obvious that the connection comprising pin 44', slot 44" and spring 82, constitute a yielding link in the connections between the actuating lug 42 and the rod 52.

Mounted to slide on rod 52 is a collar or sleeve 53. The collar 53 carries a projecting stud 54, the extended end of which is connected to a shifter link 55. See Figs. 6 and 7. Preferably, the stud 54 is rigidly secured to the end of the link 55 and is swivelled or rotatively mounted in the sleeve of collar 53. The extended end of link 55 is expanded into the form of a split annular ring or head 56, the sections of which are clamped together by bolts 57. The head 56 engages an annular flange 58 on the collar 20, to the other end of which cut-off saw 19 is rigidly but detachably secured by suitable means such as an internally threaded ring 59, all as best shown in Fig. 7. Between the groove of the head 56 and the annular flange 58, an annular lining 60 of bronze, babbitt, or the like is interposed. This bearing or lining 60 takes both the end thrust and the radial load imposed thereon.

The numeral 61 indicates a pair of coiled springs adjustably anchored to the framework by fixed brackets 62 and at their extended rear ends attached to arms 63, the lower ends of which are rigidly attached to the rock-shaft 48. Springs 62 normally hold arms 63 forward and against stop brackets 65 rigid on the sides of the main frame 11, as best shown in Fig. 3. On the side of at least one of the skid rails 10 is a longitudinally extended guide bar 66 which, as shown in Fig. 5, is T-shaped in cross-section. This guide bar 66, by any suitable or well known means, is rigidly applied to the adjacent skid rail 10.

Slidably mounted on the guide bar 66 is a releasing cam block 67 rigidly but adjustably secured to said rail by machine screws 68. As best shown in Fig. 2, the upper surface of the cam block 67 rises above the lug 42 of actuating bar 40. The exact relation and operation of this feature will be fully discussed in the summary of the operation.

Figure 1:
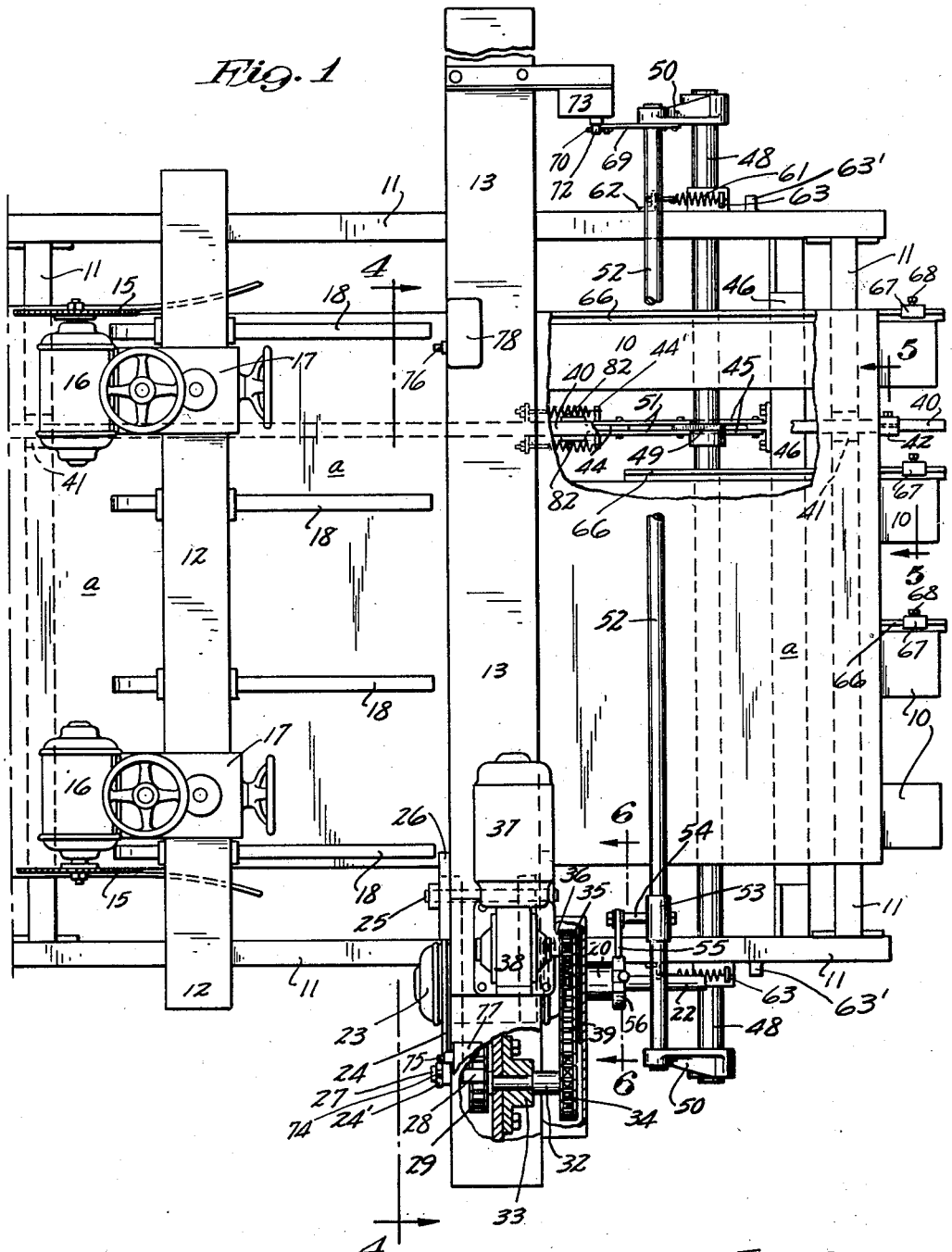
Fig. 1 is a plan view showing the delivery end portion of the machine and the features of improvement applied to the machine in accordance with my present invention, some parts being broken away and some parts being sectioned.

Preferably, the above described elements 66 and 67 are applied to several of the skid rails 10, as indicated in Figs. 1 and 2. One of the long arms 50 is provided with an upwardly extended supplemental arm or portion 69 and to the upper end of which is intermediately pivoted a switch actuating dog 70, the movement of which in one direction is limited by a stop pin or projection 71. See Fig. 3. The upper end of this dog 70 is arranged to operate on the arm 72 of an electric switch which, as shown, is mounted in a housing 73.

Figure 4:
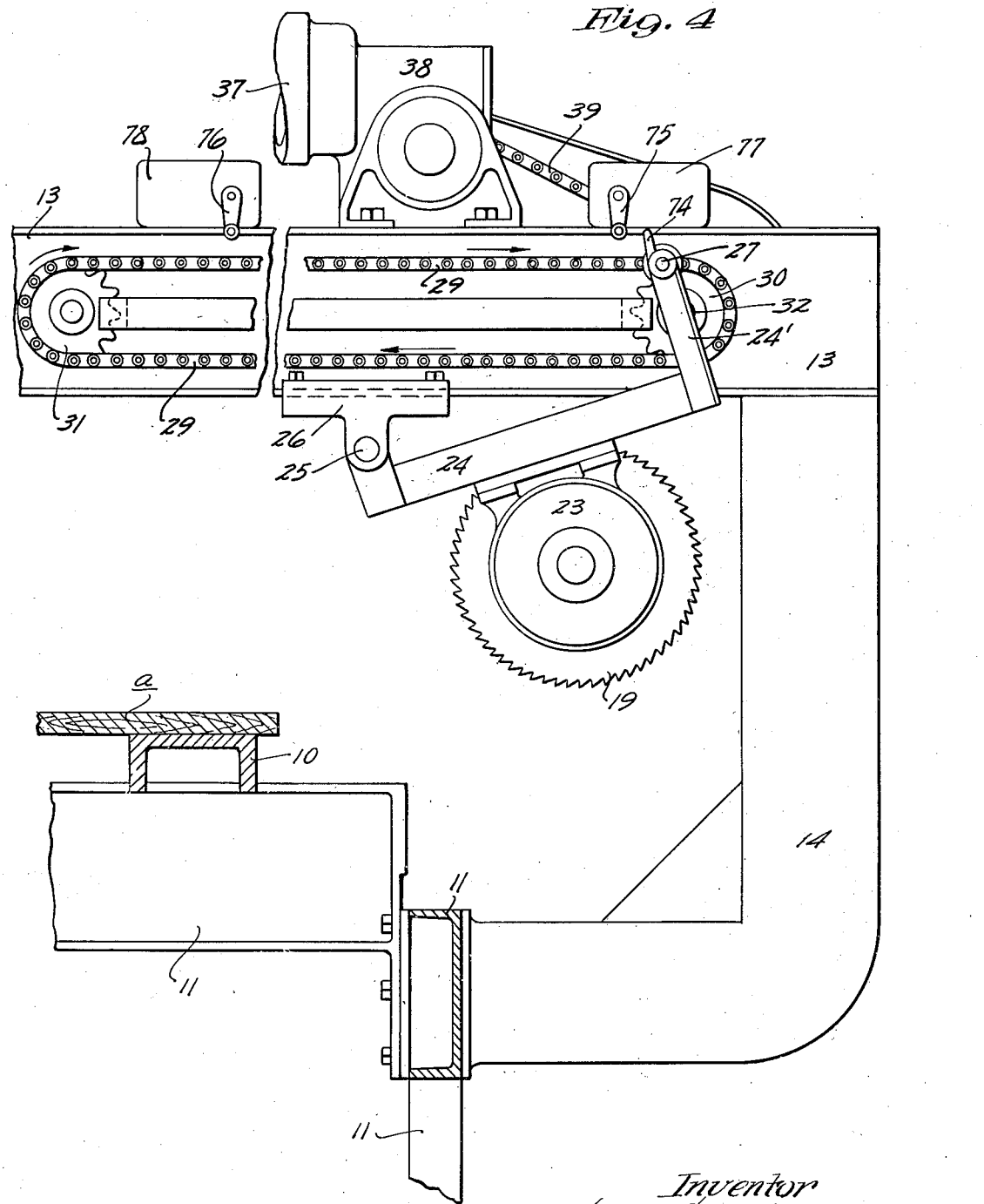
Fig. 4 is a view partly in section and partly in elevation taken approximately on the line 4—4 of Fig. 1.

As best shown in Fig. 4, the arm 24' of motor carrying frame 24 is provided with an upwardly extended switch actuating finger 74 which is arranged to act in succession on two switches presently to be noted. This switch actuating finger 74 may be mounted in different ways, but should be carried directly or indirectly by the link chain or belt 29. Finger 74 is operative on the end of a switch arm 75 and on a switch arm 76. Switch arm 75 is the actuating element of an electric switch which may be contained within a housing or switch box 77; and switch arm 76 is the actuating element of an electric switch which may be contained within a housing or switch box 78.

For the purpose of this case it is only necessary to state that the switch in box 77 and the electrical connections thereto are such that when arm 75 is moved toward the right in respect to Fig. 4 or toward the left in respect to Fig. 2, motor 37 will be cut out of action and the transverse movement of chain or belt 29 will be stopped. Also, it must be stated that the switch in box 73 and the electrical connections to motor 37 are such that when arms 50 and dog 70 are moved toward the right in respect to Fig. 3, said motor 37 will be started into action to impart movement to the sprocket chain or belt 29 and parts carried thereby in the direction of arrows marked adjacent thereto on Fig. 4.

In actual practice the means for feeding the core strip rearward will involve an electric motor and the feed mechanism may be and preferably is such as disclosed in my prior application above identified, and hence, in the complete arrangement the switch arm 76 and switch box 78 would be a switch for starting the feed motor. However, this invention is not directed to the means for feeding the core strip, and hence, the feed mechanism is not here illustrated and need not be further discussed. So far as this invention is concerned, the means for feeding the core strip may take various forms and as far as the improvement herein claimed is concerned, the strip might even be fed by hand.

To prevent the saw 19 and its hub 20 from being accidentally or otherwise slid off from the motor-driven shaft or arbor 22, I provide a stop means which, in the simple form illustrated, consists of a stop lug 63' on the beam 11 located in front of the arm 63, see Figs. 1 and 3. When arm 63 is moved from its normal position against stop 65 and into engagement with stop 63' further sliding movement of the saw will be stopped. The distance between stops 65 and 63' will, of course, be such that all of the desired traveling movement of the saw on the arbor that can take place during the automatic action will be permitted without interference by stop 63'.

Operation

The summary of the operation of the mechanism described is as follows:

Normally, the movable parts will be in the positions indicated by full lines in the drawings. When the core strip or sheet a is moved rearward into engagement with the lug 42 on actuating bar 40 and is forced rearward until lug 42 passes releasing cam block 67, the rear end of sheet a will be raised above lug 42 and released from the machine without stopping further feed movement of the core sheet a; and this is true regardless of the means for forcing the sheet a rearward.

In the machine of my prior application, when the rear end of the sheet engaged the stop lug, the feed movement of the machine would be stopped and the sheet would have to be manually removed, whereas, in the present application, the release of the sheet is automatic and will not interfere with continued or further movement of the sheet.

The cut-off motor 37 will remain idle until the core sheet has engaged lug 42 and forced actuating bar 40 rearward far enough to cause the connections 44, 51 and 49, acting through the long arms 50, to carry switch actuating dog 70 into engagement with switch arm 72 and thereby start cut-off motor 37 into action. When motor 37 is actuated, sprocket chain or belt 29 will be moved in the direction of the arrows marked thereon in Fig. 4 and motor carrying frame 24—24' will be lowered with the cut-off saw 19 and will then be moved transversely of the sheet; and the saw, which is continuously driven, will cut off the predetermined length or section of the sheet. The length of the cut off section can be varied by adjustments of the lug 42 and the cam block 67. When the cut-off saw has travelled completely across and cut off the desired section, it will be raised and then carried backward or from the left toward the right, in respect to Fig. 4, until finger 74 engages switch arm 75, thereby actuating the switch to stop the motor 37 leaving the parts again standing in the normal position shown in Fig. 4.

During the entire cut-off operation and feed movements of the core sheet, the coupling or shifting connections described and best illustrated in Fig. 7, positively hold the cut-off saw 19 the proper predetermined distance from the previously truly cut off rear end of sheet a and will accomplish this result regardless of whether or not the feed movement is stopped or whether the feed movement of the sheet be continued more or less during the cutting off operation.

By reference to Fig. 3 it will be noted that the arm 49 is just one-half the length of arms 50, and that the link 51 connects arm 49 to the central portion of arm 44. This arrangement insures lateral movement of the cut-off saw 19 that exactly corresponds to the endwise movement of actuating bar 40, and hence, to the movement that is imparted to the core sheet a after engagement with the lug 42 and during which time the cut-off action takes place.

As previously indicated, the pin 44' will normally be yieldingly pressed against the front end of slot 44" by spring 82 so that the full movement of pin 44' will be imparted to the link 51, lever 49, and arms 63 and 50, since stop 63' will normally be set so that it will nearly, but not quite, be engaged by arm 63 at the extreme of its movement in a rearward direction. However, in initially determining the proper relation between lug 42 and releasing cam 67, there is considerable danger in arriving at an adjustment thereof which would not release the sheet from the lug 42 at the time when one arm 63 was positively stopped by engagement with stop lug 63' and the prevention of undue strain on and possible breaking of the mechanism by such overrunning of the stop 63', is the function of the slot and pin connection in the linkage and spring 82. Under such conditions, the spring 82 will yield after arm 63 has been positively stopped by engagement with stop lug 63' and will permit limited rearward movement of pin 44' in slot 44".

What I claim is:

1. In a machine of the kind described, a feed table for sheets to be transversely cut, a motor-driven cut-off saw mounted for movements longitudinally and transversely of the feed table, power means for moving said saw transversely of the table to cut the sheet into sections, an actuating element mounted on said table for movements longitudinally thereof and provided with a projecting actuating lug set to be engaged by the projected edge of the sheet, a transverse guide connected to move with the saw in the direction of the movement of the sheet and said actuating element while permitting free transverse movement of said saw, means movable with the guide for initiating operation of the power means, an automatic operating connection between said actuating element and said guide, operative on said guide to automatically keep the same and said saw spaced from the actuating lug of said actuating element, regardless of whether the sheet remains stationary or is given longitudinal movement during the saw cutting action, and means operative on predetermined transverse movement of the saw for arresting operation of the power means.

2. The structure defined in claim 1 in which the power means for moving said saw transversely includes an endless belt set with upper and lower runs, whereby said saw will be lowered for cutting action and raised for return action, and means operative on predetermined return action of said saw for arresting the operation of the power means.

3. In a machine of the kind described, a feed table for sheets to be transversely cut, a bridge beam rigidly supported above and spanning said table, an endless power-driven carrier belt mounted on said bridge beam, a saw carrier guided by said beam and connected to said belt for upward and downward movements, a saw-actuating motor mounted on said carrier frame and provided with an extended shaft, a sleeve rotatable with but slidable on said motor shaft, a cut-off saw carried by said sleeve, a transverse guide rod, a slide mounted on said guide rod, and a link pivoted to said slide and connected to said saw-carrying sleeve by connections permitting free rotation of the sleeve but causing said sleeve and saw to be spaced a definite distance from the advance edge of the sheet during the saw cutting action.

4. In a machine of the kind described, a feed table for sheets to be transversely cut, an actuating bar mounted in said table for movements in the direction of the travel of the sheets and provided with a stop element for engagement with the advanced edge of said sheet, a bridge beam rigidly supported above and spanning said table, a power-driven saw shaft, a cut-off saw-equipped hub mounted on said saw shaft for rotation therewith but for forward and rearward sliding movements thereon, a pair of laterally spaced arms pivotally mounted at their lower ends, a transverse guide rod connecting the upper ends of said arms, a sleeve mounted to slide on said transverse guide rod, a connection between said sleeve and said saw-equipped hub causing the said saw-equipped hub to travel forwardly and rearwardly with said cross shaft, and connections between said spaced arms and said actuating bar constructed and arranged to cause said transverse rod to maintain a forward or rearward position constantly distant from the stop lug of said actuating bar, whereby said cut-off saw will be maintained a constant distance from the front edge of the sheet, regardless of whether or not there is movement of the latter during the transverse cutting action.

5. The structure defined in claim 4 in which said cut-off saw and its hub are caused to move on said bridge beam horizontally along a relatively low line during the cutting operation and along a line higher up under return movement.

6. In a machine of the kind described, a feed table for the sheets to be transversely cut, an actuating bar mounted in said table for forward and rearward movements and provided with a stop element for engagement with the advanced edge of the sheet, a bridge beam rigidly supported above and spanning said table, a power-driven belt mounted to travel on said bridge beam in a relatively low position for sawing action and in a relatively high position for return action, a saw-carrying frame mounted at one end to travel horizontally on said beam and at its upper end pivotally connected to an element of said belt, a motor mounted on said saw-carrying frame and provided with a forwardly projecting shaft, a cut-off saw-equipped hub mounted to slide upon but rotate with said motor shaft, laterally spaced arms pivotally mounted at their lower ends, a guide rod connecting the upper ends of said spaced arms, a sleeve slidable on said guide rod, a link pivotally connected to said sleeve and at its free end connected to said saw-equipped hub with freedom for rotation of the latter, and a lever and link connection between said spaced arms and said actuator bar constructed and arranged to maintain said saw at a constant distance from the stop lug of said actuating bar, regardless of whether or not the sheet is moved during the transverse cutting action.

7. The structure defined in claim 6 in which the connection between said spaced arms and actuator bar includes a relatively short arm connected to oscillate with said spaced arms, a relatively short lever pivotally connected to said actuating slide at its upper end, a link connecting the lower end of said last noted lever to a fixed base of reaction, and a link connecting the upper end of said relatively short arm to the intermediate portion of said relatively short lever.

8. The structure defined in claim 6 in which the connection between said spaced arms and actuator bar includes a relatively short arm connected to oscillate with said spaced arms, a relatively short lever pivotally connected to said actuating slide at its upper end, a link connecting the lower end of said last noted lever to a fixed base of reaction, a link connecting the upper end of said relatively short arm to the intermediate portion of said relatively short lever, a spring anchored in respect to said feed table and yieldingly pressing said long arms rearward, and a stop limiting the rearward pulling action of said spring.

9. The structure defined in claim 3 in further combination with stop means for limiting the axial movement of said cut-off saw on said motor shaft.

10. In a machine of the kind described, means for feeding and guiding strips to form a core-forming sheet, means for transversely cutting the sheet comprising a transverse bridge beam, a saw carriage mounted to travel thereon, a bracket pivotally attached at one end thereof to said carriage, a saw mounted on an intermediate part of said bracket, an endless belt arranged to travel in a vertical plane longitudinally of said bridge beam, means within the beam for guiding and driving said belt, and means connecting the other end of said saw-supporting bracket to the said endless belt, whereby said saw in one direction of travel will be lowered into cutting elevation and in the opposite direction of travel will be raised out of cutting elevation.

11. In a machine of the kind described, a feed table for sheets to be transversely cut, a motor-driven cut-off saw mounted for movements longitudinally and transversely of the feed table, means for moving said saw transversely of the table to cut the sheet into sections, an actuating element mounted on said table for movements longitudinally thereof and provided with a projecting actuating lug set to be engaged by the projected edge of the sheet, a transverse guide connected to move with the saw in the direction of the movement of the sheet and said actuating element while permitting free transverse movement of said saw, an automatic operating connection between said actuating element and said guide, operative on said guide to automatically keep the same and said saw spaced from the actuating lug of said actuating element, regardless of whether the sheet remains stationary or is given longitudinal movement during the saw cutting action, means positively limiting movements of the motor-driven cut-off saw longitudinally of the feed table in the direction of feed, said operating connection including a yielding link and being constructed and arranged to allow limited movement of the actuating lug after traveling movements of the saw with the sheet have been positively stopped.

12. In a machine of the kind described, means for feeding and guiding strips to form a core-forming sheet, means for transversely cutting the sheet comprising a transverse bridge beam, a saw carriage mounted to travel thereon, a bracket pivotally attached to said carriage, a saw mounted on said bracket, an endless belt arranged to travel in a vertical plane longitudinally of said bridge beam, means for guiding and driving said belt, means connecting the free end of said saw-supporting bracket to the said endless belt, whereby said saw in one direction of travel will be lowered into cutting elevation and in the opposite direction of travel will be raised out of cutting elevation, an electric motor directly connected to said saw and supported by said saw-carrying bracket, an electric operating circuit for the cut-off saw motor, said means for driving said belt and saw carriage including a circuit having a control switch and an actuator for said last named control switch aranged to trip the same and complete the last named circuit when said core sheet has been projected a predetermined distance beyond the line of travel of the cut-off saw.

OSCAR S. BOLLING.